United States Patent
Mattes

(10) Patent No.: US 6,783,153 B2
(45) Date of Patent: Aug. 31, 2004

(54) PROTECTIVE MOTORCYCLE SUIT

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/066,469

(22) Filed: Jan. 31, 2002

(65) Prior Publication Data

US 2002/0113417 A1 Aug. 22, 2002

(30) Foreign Application Priority Data

Jan. 31, 2001 (DE) .......................................... 101 04 019

(51) Int. Cl.$^7$ ............................................. B60R 21/32
(52) U.S. Cl. ..................... 280/735; 280/730.1; 180/271
(58) Field of Search ........................... 280/728.1, 730.1, 280/734, 735; 2/456, DIG. 3; 180/271

(56) References Cited

U.S. PATENT DOCUMENTS

| 5,362,098 A | * | 11/1994 | Guill | .......................... 280/733 |
|---|---|---|---|---|
| 5,593,111 A | * | 1/1997 | Jackson et al. | .......... 244/110 D |
| 5,746,442 A | * | 5/1998 | Hoyaukin | ................. 280/730.1 |
| 6,097,287 A | * | 8/2000 | Lu | .............................. 340/479 |
| 6,125,478 A | * | 10/2000 | Alaloof | .......................... 2/456 |
| 6,139,050 A | * | 10/2000 | Bultel et al. | .............. 280/730.1 |
| 6,206,416 B1 | * | 3/2001 | Faigle et al. | ................. 280/735 |
| 6,552,662 B1 | * | 4/2003 | Bomya et al. | ............ 340/572.1 |

FOREIGN PATENT DOCUMENTS

| FR | 2807983 A1 | * | 10/2001 | ........... B60R/21/26 |
|---|---|---|---|---|
| GB | 1524022 A | * | 9/1978 | ............. A42B/3/02 |

* cited by examiner

Primary Examiner—David Dunn
(74) Attorney, Agent, or Firm—Kenyon & Kenyon

(57) ABSTRACT

A protective motorcycle suit has at least one airbag, power being supplied and data communication with the motorcycle being carried out via a wireless connection. To allow power to be transferred, coils are provided in the seat areas of the protective motorcycle suit, and radio stations in the microwave range are provided to allow data transmission.

1 Claim, 1 Drawing Sheet

PROTECTIVE MOTORCYCLE SUIT

BACKGROUND INFORMATION

The Italian two-wheel vehicle manufacturer Aprilia offers an airbag for motorcyclists. Herein, the airbag is worn like a vest and in the event of a fall inflates abruptly. The airbag is attached to the motorcycle via a release cord. As soon as the motorcycle is inclined by more than a specific amount, the release cord activates a safety valve. The airbag fills within three hundredths of a second.

SUMMARY OF THE INVENTION

The protective motorcycle suit according to the present invention has the advantage that for the airbag there is no mechanical attachment between the protective motorcycle suit and the motorcycle. This is thanks to the fact that information and power are transmitted via a wireless connection. This means the motorcyclist and passenger, if present, have greater freedom of movement, and the restraint means does not hamper them. Moreover, it is possible, for example, to avoid a situation in which the motorcyclist forgets to plug in a connector when getting on or unplug it when getting off, which ensures a higher acceptance level for such restraint means among motorcyclists and their passengers.

It is especially advantageous that the at least one coil is arranged in the seat area of the suit for transferring power, so that in conjunction with an opposite coil located in the motorcycle seat area this constitutes a transducer.

Furthermore, it is advantageous that the radio station used for information transfer transmits in the microwave range, the ISM (Industrial, Scientific and Medical Use) frequency bands being made available for short range applications of this kind, this being in the gigahertz range and hence also the microwave range. This relatively high frequency range that has been made available for short range applications does not interfere with other nearby communications connections.

Furthermore, it is advantageous that the trigger device that is attached to the motorcycle is connectable to sensors for detecting a collision, so that in the event of a collision the trigger device triggers the airbags in the protective motorcycle suit via communication via the radio stations that are provided. Furthermore, the device according to the present invention has a seat occupancy detection system, which functions here in particular by measuring the phase shift of the given coils in the motorcycle seat areas.

DETAILED DESCRIPTION

Figure 1:
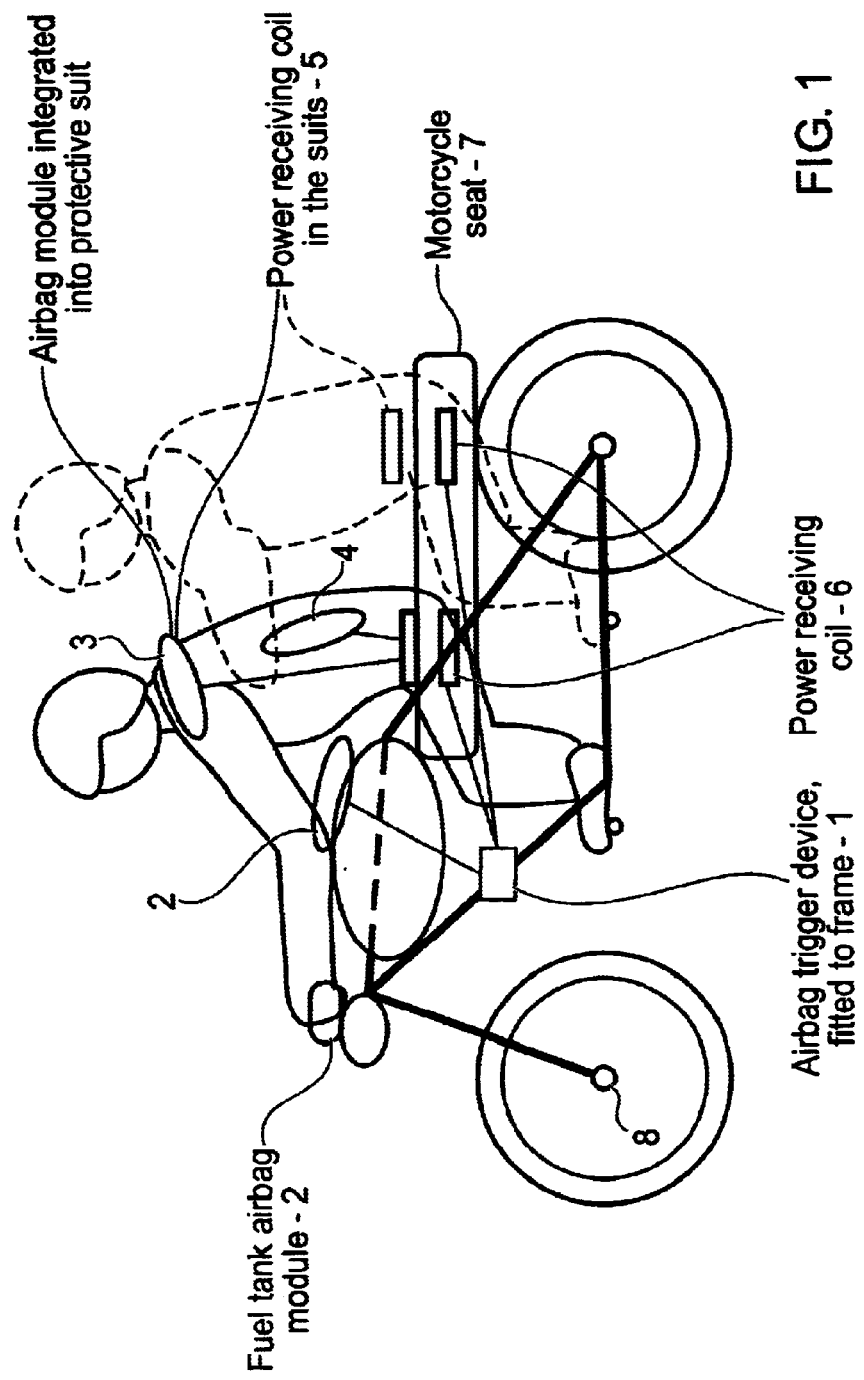
FIG. 1 shows a view of a motorcycle with people on it.

In the event of an accident, a motorcyclist is at particular risk, due to the lack of a crumple zone, as he is generally thrown from his motorcycle. A typical accident scenario is that first the motorcyclist's head strikes the engine hood or trunk lid of the other vehicle, and then his back is thrown against the edge of the vehicle's roof. Herein, in particular back injuries due to strain may be caused. Therefore a protective motorcycle suit having airbags has an airbag for the neck which is designed to protect against concussion so as to avoid a situation in which the injured person vomits and therefore may suffocate, and a back airbag in particular to protect his back against spinal cord injuries.

According to the present invention, communication and transfer of power between the protective motorcycle suit having the air bags and the motorcycle are carried out via wireless transmission. Herein, coils are used to transfer the power, so as to constitute a transducer. On the primary side, i.e., on the motorcycle side, the coils are arranged in the seat areas, and on the secondary side, i.e., in the protective motorcycle suits, they are arranged in the seat areas of the protective motorcycle suit in question. Radio transmission between the trigger device and the airbags of the protective motorcycle suit is carried out in particular in the microwave range, as in this range free frequency bands are available for short range applications of this kind.

FIG. 1 shows a view of a motorcycle with people on it. A driver and a passenger are seated on the motorcycle. The driver has a protective motorcycle suit having a neck airbag 3 and a back airbag 4. Neck airbag 3 and back airbag 4 each have a radio station to allow communication with an airbag trigger device 1 on the motorcycle. Alternatively, it is feasible for the airbags of a protective motorcycle suit to exchange information with airbag trigger device 1 via a joint radio station. Furthermore, a protective motorcycle suit has a coil 5 which is arranged in the seat area of the protective motorcycle suit and receives power. The passenger's protective motorcycle suit also has a power-receiving coil in the seat area of the suit.

Furthermore, coils are also arranged on the primary side in seat 7 opposite the aforementioned coils in the protective motorcycle suits. These are coils 6. Thus power is supplied inductively at below the long wave range, e.g., at a frequency of about 120 kHz. Coils 6 arranged in motorcycle seat 7 are wire or strip conductor coils that are arranged in the foamed plastic of seat 7. Their resonance is at a carrier frequency of about 120 kHz. Coils 5 arranged in the seat areas of the suit receive a relatively small amount of power—a few milliwatts—e.g., 50 milliwatts for two airbags per suit.

These coils also allow seat occupancy detection to be carried out, as a phase shift arises on the primary side, i.e., at coil 6, if a counter-coil is present. If this phase shift is detected, the corresponding seat area is occupied, and trigger device 1, which is mounted on the motorcycle frame, has to be able to communicate with corresponding airbags 3 and 4 after a delay time of a few seconds, e.g., less than 10 seconds, otherwise an error is present and is displayed. Trigger device 1 has an interface to coils 6 and also has a processor and a radio station. The processor is used to evaluate signals, and the radio station is used to communicate with the airbags that are in the protective motorcycle suits. Furthermore, trigger device 1 is connected to sensors to detect a collision as early and as quickly as possible. For example, acceleration sensors 8 are provided on the front-wheel floating axle and communicate with airbag trigger device 1 via a line and a digital interface, and in the event of a collision send correspondingly substantial deceleration signals to airbag trigger device 1.

In addition to the airbags in protective suits 3 and 4, further airbag 2 may be provided on the motorcycle's fuel tank. Airbag 2 is connected to airbag trigger device 1 via a line. By contrast, airbags 3 and 4 have radio stations via which communication with trigger device 1, which also has a radio station, is possible at a frequency that is in the gigahertz range. Herein, ISM frequency band frequencies are used, i.e., 2.45 GHz, 5.8 GHz, or 24 GHz. This constitutes bi-directional communication so that ignition commands and diagnostic requests are received from trigger device 1 and diagnostic data are sent to the trigger device.

Airbags are triggered if trigger device 1 detects that the motorcycle has undergone a collision that must result in triggering. Trigger device 1 accomplishes this, for example, using sensors 8 that are arranged on the front-wheel floating axle. Herein, the airbags in the protective motorcycle suits are only triggered when the seat occupancy detection system has detected people on seat 7 via the phase shift. The ignition units that are assigned to airbags 3 and 4 are connected via lines to power receiving coils 5 and have power reserves so that during a specified survival time, e.g., two seconds, during which no power is sent from the motorcycle to the protective motorcycle suit, they will nevertheless perform ignition. To accomplish this, electrical low-power ignition jumpers that are ignitable by, for example, energy of 100 mJ or less, are used.

Alternative means for seat occupancy detection, for use of more or fewer airbags, and the use of a different frequency range for data transmission are also possible.

What is claimed is:

1. A device for triggering at least one airbag contained in a motorcycle suit, comprising:

at least one sensor on a motorcycle for detecting a collision;

a radio station for receiving data from a transmitter provided in the motorcycle suit;

a trigger device adapted to be connected to the at least one sensor and to the radio station;

coils in seat areas of the motorcycle to allow power to be transferred; and means for detecting seat occupancy; wherein:

the means for detecting seat occupancy functions by measuring a phase shift of a respective one of the coils.

* * * * *